United States Patent
Livingston

(10) Patent No.: US 7,061,632 B1
(45) Date of Patent: Jun. 13, 2006

(54) METHOD AND APPARATUS FOR SELECTIVE APPLICATION OF IMAGING RELATED OPTIONS TO ARBITRARY PAGES TO DATA

(75) Inventor: Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/430,675

(22) Filed: Oct. 28, 1999

(51) Int. Cl.
*G06F 15/00* (2006.01)

(52) U.S. Cl. .................. 358/1.15; 358/1.13; 358/1.14; 399/8

(58) Field of Classification Search ............... 358/1.12, 358/1.13, 1.14, 1.15, 1.18, 296, 298; 707/515, 707/525; 399/8, 82, 83, 84
See application file for complete search history.

(56) References Cited

U.S. PATENT DOCUMENTS

| | | | |
|---|---|---|---|
| 5,615,015 A * | 3/1997 | Krist et al. ................. | 358/1.15 |
| 5,706,411 A | 1/1998 | McCormick et al. ....... | 395/113 |
| 5,734,390 A * | 3/1998 | Sakaizawa et al. ............ | 347/2 |
| 5,790,119 A | 8/1998 | Sklut et al. .................. | 345/349 |
| 5,832,298 A | 11/1998 | Sanchez et al. ............. | 395/828 |
| 5,859,711 A | 1/1999 | Barry et al. ................ | 358/296 |
| 5,978,557 A * | 11/1999 | Kato ......................... | 358/1.15 |
| 6,041,200 A * | 3/2000 | Glass et al. .................... | 399/82 |
| 6,120,197 A * | 9/2000 | Kawamoto et al. ........... | 400/61 |
| 6,301,013 B1 * | 10/2001 | Momose et al. ........... | 358/1.15 |
| 6,636,326 B1 * | 10/2003 | Zuber ........................ | 358/1.14 |
| 6,650,431 B1 * | 11/2003 | Roberts et al. ............. | 358/1.15 |

FOREIGN PATENT DOCUMENTS

| | | |
|---|---|---|
| EP | 0586186 | 3/1994 |
| EP | 0893753 | 1/1999 |
| JP | 06-309124 | 11/1994 |
| JP | 07-030773 | 1/1995 |

(Continued)

OTHER PUBLICATIONS

A Graphical User Interface For A Printer Driver On An HP LaserJet 8100; pp. 1/3; printed: Sep. 30, 1999 & Oct. 19, 1999.

(Continued)

*Primary Examiner*—Mark Wallerson

(57) ABSTRACT

A program module operates with an application program and a printer driver to allow assignment of features to arbitrary pages of a document generated by the application program. Additionally, the program module operates to permit printing on one or more imaging devices of the document pages according to the features assigned to the document pages. The features available for assignment include watermarks, multiple pages per unit of printing media, destination printer, paper source, and stapling. In addition to allowing a user to specify an arbitrary page range for application of the selected feature or features, the program module allows the user to select from preset page classes for application of the feature or features. These preset page classes include options such as, first page, last page, even pages, and odd pages. Furthermore, the program module permits assignment of features to document pages based upon characteristics of pages. For example, document pages including color would be sent to a printer configured for color printing and monochrome document pages would be sent to a printer configured for monochrome printing. The program module generates a graphical user interface that permits the user to assign one or more features to document pages. In addition, the graphical user interface permits the user to preview document pages to determine the feature or features assigned to the pages.

4 Claims, 6 Drawing Sheets

FOREIGN PATENT DOCUMENTS

| | | |
|---|---|---|
| JP | 8-244289 | 9/1996 |
| JP | 9-37004 | 2/1997 |
| JP | 9-190426 | 7/1997 |
| JP | 09-190426 | 7/1997 |
| JP | 09-226186 | 9/1997 |
| JP | 10-285421 | 10/1998 |
| JP | 11-58893 | 3/1999 |

OTHER PUBLICATIONS

European Search Report, Jan. 11, 2001.
Japanese Associate's letter dated Aug. 5, 2003, enclosing an English translation of the Japanese Office Action dated May 20, 2003.

* cited by examiner

METHOD AND APPARATUS FOR SELECTIVE APPLICATION OF IMAGING RELATED OPTIONS TO ARBITRARY PAGES TO DATA

FIELD OF THE INVENTION

This invention relates generally to control of an imaging device. More particularly, this invention relates to a program module used with a driver or drivers for an imaging device.

BACKGROUND OF THE INVENTION

Many software applications, such as word processing applications or graphics generating applications interface with an imaging device driver module to generate a hard copy output of the text and images created by the user. The hard copy output can generally be generated on a wide variety of imaging devices, such as electrophotographic printers or copiers, inkjet printers, dot matrix printers, or the like. To start the process of generating a hard copy output of the text and images created by the user, the user typically initiates the imaging operation through the application program. For example, many word processing applications have a menu bar from which the user selects "print" to open a window through which parameters used by the printer driver can be entered or selected. Currently, printer drivers offer a relatively limited selection of options for the user. A need exists for a program module providing an expanded selection of options for the user.

SUMMARY OF THE INVENTION

Accordingly, a computer implemented method for selectively applying at least one of a plurality of imaging related options to at least one of a plurality of pages of data includes selecting at least one of the plurality of imaging related options to form selected options. The computer implemented method also includes assigning the selected options to an arbitrary one or more of the plurality of pages of data.

A system for generating data used to form images on media with at least one imaging device includes a processor to execute a first set of instructions to generate the data. The first set of instructions includes a configuration to form a plurality of pages from the data and to execute a second set of instructions. The second set of instructions includes a configuration to allow selection of at least one of a plurality of imaging related options to form selected options and a configuration to allow assignment of the selected options to an arbitrary one or more of the plurality of pages of data. The system also includes a memory coupled to the processor and configured to store the first set of instructions and the second set of instructions. The system additionally includes an interface coupled between the processor and the at least one imaging device.

A storage device includes functional information for use with a first set of computer executed instructions used to generate a plurality of pages of data. The storage device includes a computer readable medium. The storage device additionally includes a second set of computer executed instructions included in the functional information and stored on the computer readable medium. The second set of computer executed instructions includes a configuration to allow selection of at least one of a plurality of imaging related options to form selected options. The second set of computer executed instructions further includes a configuration to allow assignment of the selected options to an arbitrary one or more of the plurality of pages of data.

DESCRIPTION OF THE DRAWINGS

A more thorough understanding of embodiments of the invention may be had from the consideration of the following detailed description taken in conjunction with the accompanying drawings in which.

DETAILED DESCRIPTION OF THE DRAWINGS

Figure 1:
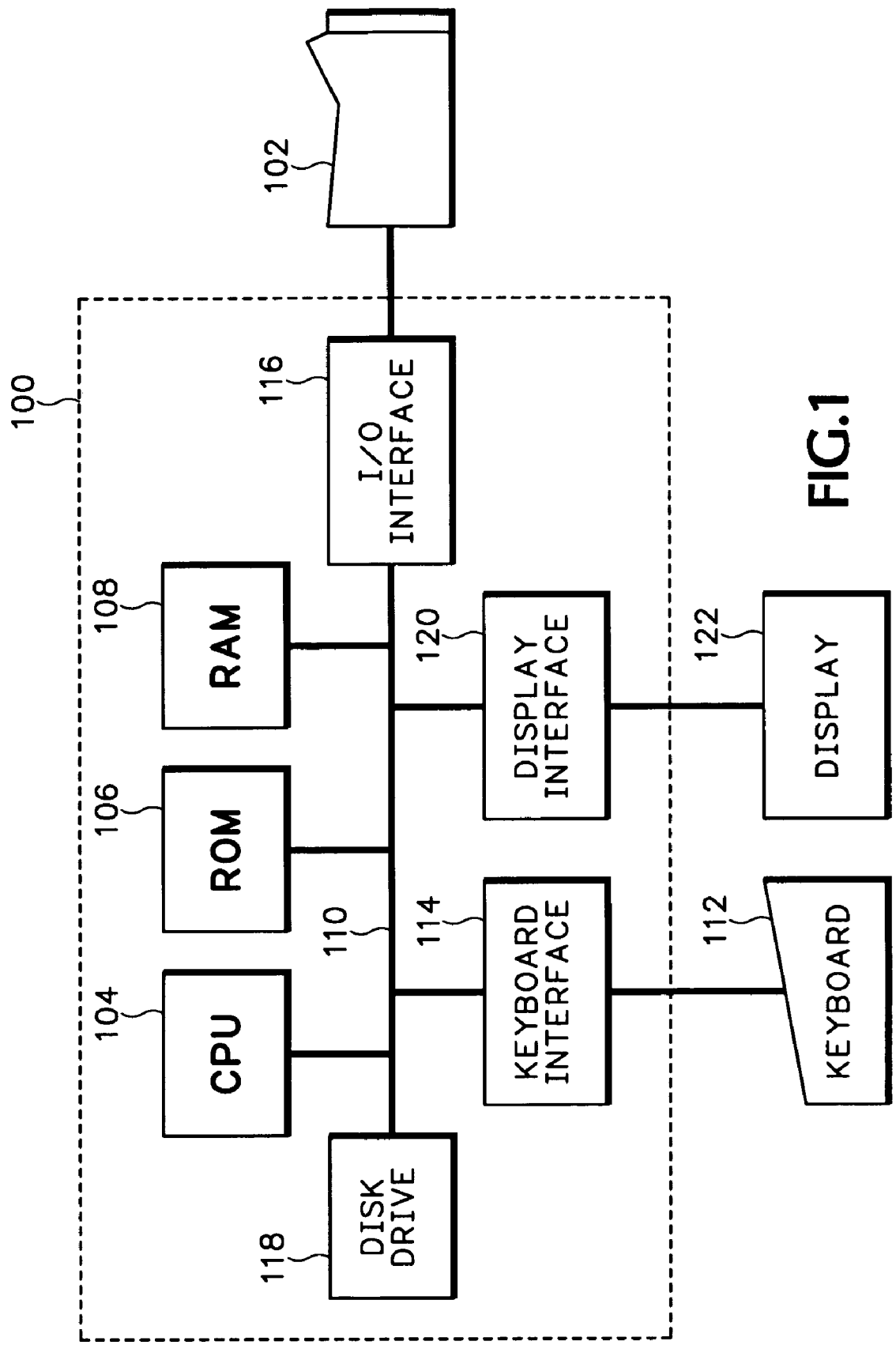
FIG. 1 shows a block diagram of a computer system for executing an embodiment of the program module.

Although an embodiment of the program module will be discussed in the context of an imaging device, such as an electrophotographic printer, it should be recognized that the program module has applicability in a wide variety of imaging devices, such as digital copiers, inkjet printers, dot matrix printers, impact printers, and the like. Furthermore, although the program module will be discussed in the context of an application program for performing word processing, it should be recognized that the program module has applicability to any application program that includes the capability to send data to an imaging device to generate images corresponding to the data on media.

After creation of a document using an application program, such as a word processing application, spread sheet application, overhead slide application, image generating application, graphics generating application, or the like, a user may want to create a hard copy of the document created with the application program by initiating an imaging operation such as printing. Typically, the application program will segment the document created by the user into pages so that each document page corresponds to one unit of media during the imaging process. However, it is possible that when the hardcopy output is generated, more than one page of the document is included on a single unit of the print media. This can occur when duplex printing is performed, or when the document page is formatted in the imaging device to fit multiple document pages on a single unit of the print media (referred to as N-up printing, where N represents the number of document pages included on each unit of print media) Generally, the document created by the user includes more than one page of data. The user may wish to selectively apply certain imaging related options to one or more specific pages of the document generated by the application program. This selection might be made based upon characteristics of specific pages in the document or based upon a need to apply certain features to specific pages of the document. The options may include such features as the application of a watermark to a page, the source of the media upon which the page will be printed (thereby allowing the user to control the type of media on which a specific page or pages of the document are printed), printing of pages on both sides of the media, printing of multiple pages per sheet, or the like.

In some cases, the computer executing the application program is connected through a network to a plurality of imaging devices of varying capability. For example, the imaging devices coupled to the network may include an inkjet printer including a configuration for color printing and a monochrome electrophotographic printer including a configuration for generating output at a high rate relative to the inkjet printer. A document created by the user may include one or more pages with text or images created in color and one or more of the pages with text and images created only in monochrome. If the computer included the capability to selectively send one or more specific pages to either the inkjet printer or the electrophotographic printer, then the user could print the entire document by executing a single print job. Those pages including color text or images would be sent to the inkjet printer and those pages including only monochrome text or images would be sent to the monochrome electrophotographic printer. In addition to completely performing the printing operation on the document with the execution of a single print job, the speed for completing the print job and the quality of the print job would be improved. Those pages including only monochrome text or images could be rapidly printed on the monochrome electrophotographic printer. Only those pages including color text and images would be in color on the inkjet printer at a lower printing speed than the monochrome electrophotographic printer. Additionally, if the resolution available from the monochrome electrophotographic printer is greater than for the inkjet printer, the quality of the monochrome printing will be improved. Therefore, it is advantageous for a user, both in terms of speed and quality of output, to have the capability to selectively send, on a per-page basis, an arbitrary one or more pages of the print job to user selected imaging devices.

In addition to permitting a user to arbitrarily select a page or page range for application of one or more of the features, the disclosed embodiment of the program module includes the capability to select certain preset classes of pages for applying one or more of the features. For example, the program module could include selections that would allow the user to apply the selected features to all of the pages, the first page of the document, the last page of the document, even pages in the document, odd pages in the document, or the current page.

Shown in FIG. 1 is a high level block diagram of a system including a computer 100 and an imaging device, such as printer 102, in which the program module operates to generate hard copy. A processor, such as central processing unit (CPU) 104, executes an application program, a printer driver, and the program module. Read only memory 106 includes firmware used by CPU 104 during boot up of the operating system. Random access memory (RAM) 108 serves as temporary storage for the application program, a printer driver, and the program module. An internal bus 110 connects the various hardware elements internal to computer 100. The user enters information into computer 100 during operation of the application program using keyboard 112. Keyboard 112 interfaces to internal bus 110 through keyboard interface 114. An input output port (I/O interface) 116 couples internal bus 110 to printer 102.

A storage device, such as disk drive 118 is coupled to internal bus 110. Disk drive 118 provides non-volatile storage for data generated during the execution of the application program on CPU 104. In addition, before the user begins execution of the application program, the code for the application program, the printer driver, and the program module is loaded from disk drive 118 into RAM 108. It should be recognized that other storage devices such as floppy disk drives, tape drives, optical drives (including, for example, CD-ROM drives, DVD drives, or magneto optic drives), or the like, may be used as a storage device. In addition, it should be recognized that computer 100 may send data to and receive data from an additional arbitrary number of storage devices over a network connection, such as a local area network, or a wide area network, such as the Internet. Accordingly any one or more of these storage devices coupled to the network may store any or all of the application program, the printer driver, or the program module or parts of these.

Display interface 120 receives video display data sent by CPU 104. From this video display data, display interface 120 generates the signals necessary to display the images on display 122 that correspond to the video display data. If an application program was under execution by CPU 104, the video display data sent by CPU 104 to display interface 120 includes data to display the activities performed during execution of the application program and the data (such as the text of a document created using a word processing application) generated by the application program.

Figure 1A:
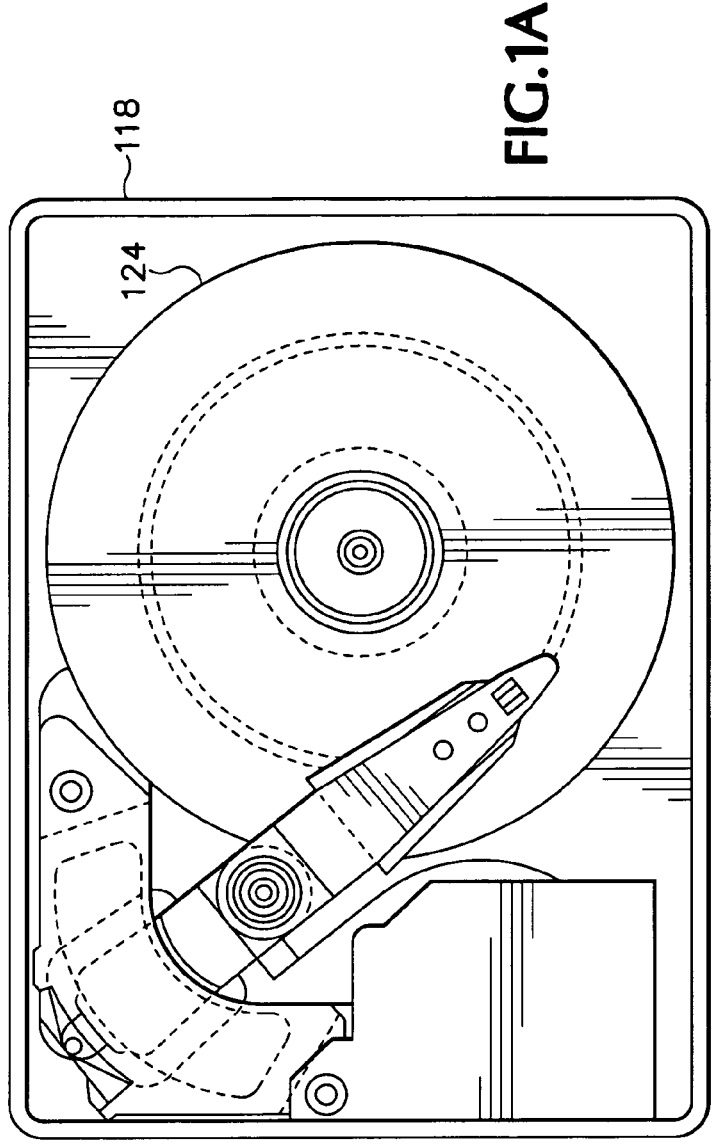
FIG. 1A shows a disk drive including a disk.

Shown in FIG. 1A is an exemplary embodiment of a storage device, disk drive 118. Disk drive 118 includes a computer readable medium, such as disk 124. The code used by CPU 104 for execution of the application program, the printer driver, and the program module could be stored on disk 124 in the form of encoded magnetic transitions. Additionally, if the storage device included a tape drive, the computer readable medium would include magnetic tape. In this case, the application program, the printer driver, and the program module could be stored on the magnetic tape in the form of encoded magnetic transitions. Furthermore, if the storage device included an optical drive, such as a CD-ROM drive or a DVD drive, the computer readable medium would include optical media, such as an optical disk. In this case, the application program, the printer driver, and the program module could be stored on the optical disk in the form of pits and lands formed in the surface of the optical disk. In addition, if the storage device included ROM or RAM memory, the computer readable medium would include the semiconductor material forming the devices used that store information in the ROM or RAM memory.

Figure 2:
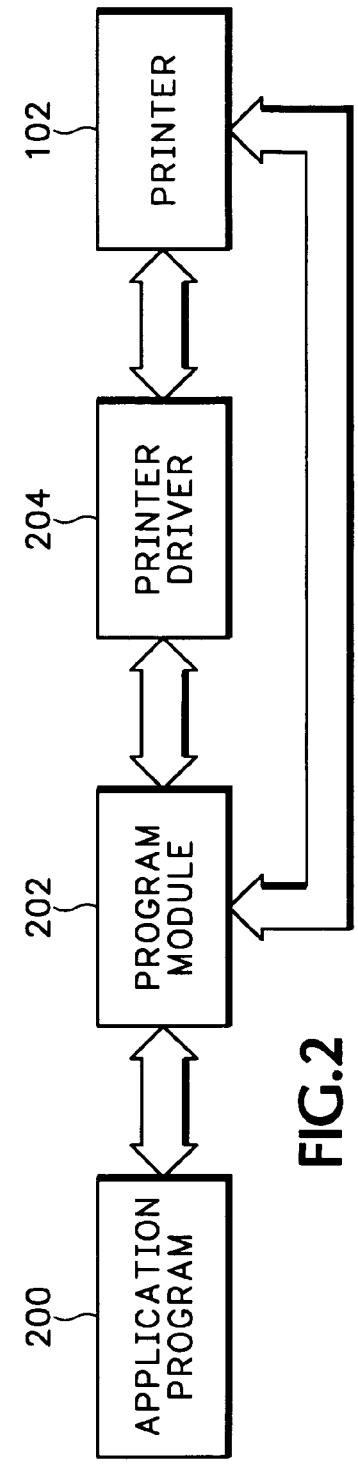
FIG. 2 is a conceptual block diagram showing the relationship between an embodiment of the program module, an application program, and a printer driver.

Shown in FIG. 2 is a conceptual block diagram illustrating the functional relationships between application program 200, an embodiment of the program module, program module 202, and printer driver 204. The embodiment of program module 202 primarily bi-laterally communicates with printer 102 through printer driver 204. However, the embodiment of program module 202 includes a configuration to directly communicate with printer 102. The embodiment of program module 202 serves as the primary interface between the application program 200 and the printer driver 204. The embodiment of program module 202 includes the functionality for allowing the user to selectively apply features to any of the pages for which an image is to be generated using the imaging device and to send any page, pages, or page range to any one or more of multiple imaging devices.

Figure 3:
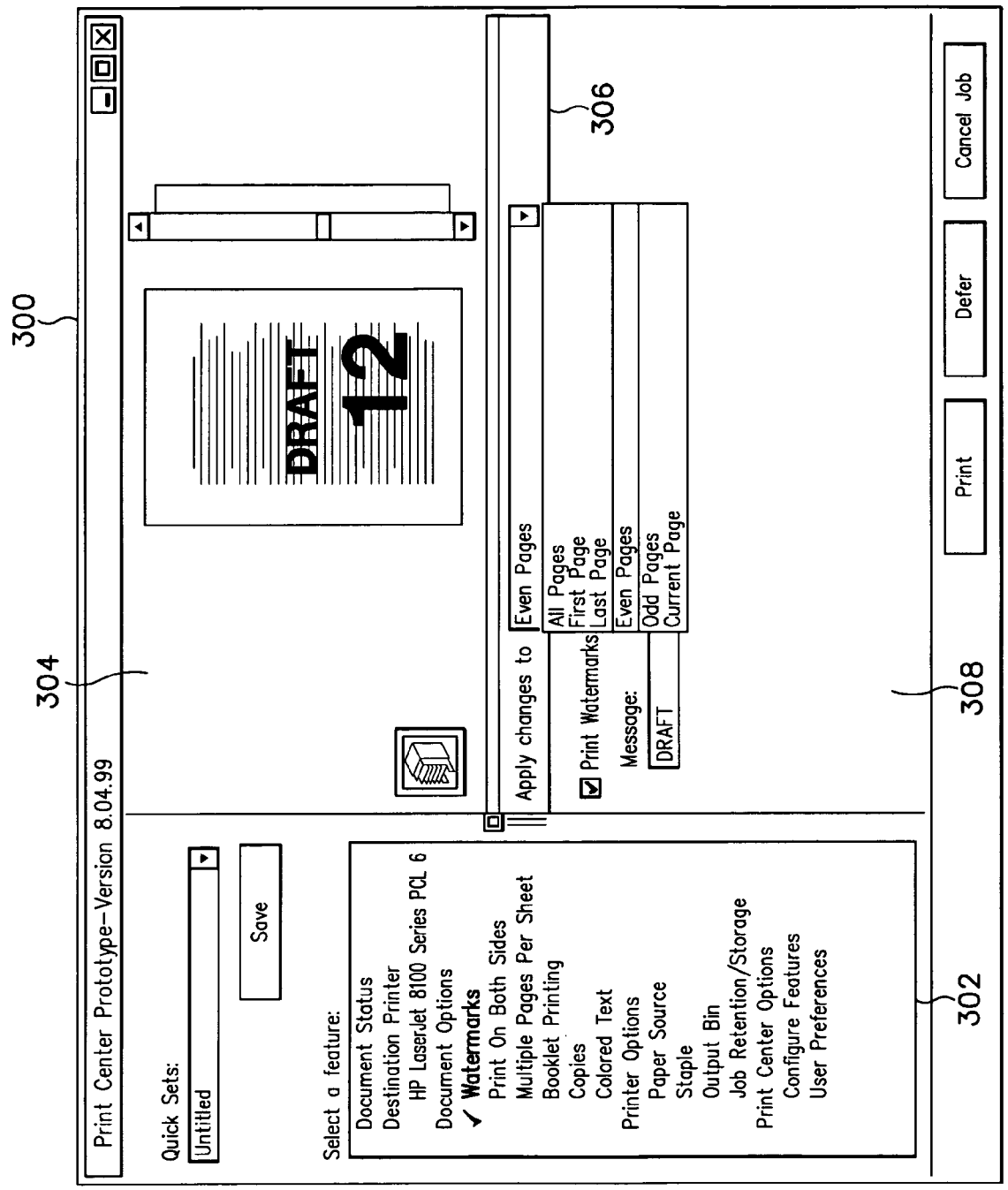
FIGS. 3–5 show window generated by an embodiment of the program module that illustrate various capabilities of the embodiment of the program module.

Shown in FIG. 3 is a representative window 300 generated on display 122 by an embodiment of program module 202. Window 300 generated by the embodiment of program module 202 serves as the graphical user interface allowing the user to select the desired features and the page, preset page classes, or user defined page ranges, to which the features will be applied. In box 302, the features available for the user to select are presented. The features include applying watermarks to the printed pages, printing multiple pages per unit of print media, printing on both sides of each unit of print media, selecting the media source of media upon which printing will be performed, and selecting the output bin in which the print media will be deposited after printing. Box 302 permits the user to easily determine the features selected by displaying a check next to each selected feature. Box 304 shows a print preview of page 12 of the document indicating, with a superimposed "12" which page is previewed and indicating that a "DRAFT" watermark will be included in the printing of page 12.

In band 306 (labeled "Apply changes to:"), the user is provided with a capability for selecting the pages to which the features will be applied. As seen from the pull down menu below band 306, a variety of preset page classes are available for selection. In FIG. 3, the option for applying the selected feature to even pages is selected. The other possibilities for selecting the pages includes: All Pages, First Page, Last Page, Even Pages, Odd Pages, and the Current Page. The "All Pages" selection applies the feature to every page in the document. The "First Page" selection applies the feature only to the first page in the sequence of pages defined by the application program. The "Last Page" selection applies the feature only to the last page in the sequence of pages defined by the application program. The "Even Pages" selection applies the feature only to the even pages defined by the sequence of pages in the application program. The "Odd Pages" selection applies the feature only to the odd pages as defined by the sequence of pages in the application program. The "Current Page" selection applies the feature only to the page currently previewed in box 304.

In addition to the preset page classes, program module 202 includes a configuration to apply the selected feature or features to an arbitrary page or pages of the document created by the user. The pages to which the user desires to apply the feature or features may be specified individually or as part of a range. For example, entering "Pages 4–18" in band 306 would apply the selected feature or features to the pages beginning with page 4 and ending with page 18. Also, typing "Pages 3–5, 12, 14, 20–22" would apply the selected feature or features to page 3, 4, 5, 12, 14, 20, 21, and 22. Program module 202 includes data structures that associate each selected feature or features independently with each of the pages of the document. This association permits the selected feature or features to be independently assigned to any one or more of the pages in the document. Program module 202 is configured so that after a feature or features are assigned to the selected page, page range, or preset page class using band 306, subsequent changes to selected features through box 302 will only be applied to the selected page, page range, or preset page specified in band 306.

Band 306 is positioned in window 300 just below box 304. Box 304 can be resized by the user. If box 304 is resized, band 306 will change position with the resizing of box 304 so that band 306 remains located just below box 304. Box 308 allows the user to specify certain parameters of the selected feature. For example, box 308 in FIG. 3 shows the selection of the watermarks feature and the specification of the words to be included in the watermark, in this case the word "DRAFT".

Program module 202 assigns the page numbers of the document based upon the sequence of pages defined by the application program. The data generated by the application is delivered to the imaging device according to this sequence of pages defined by the application program. Therefore, it should be recognized that the page numbers, as assigned by the user of the application program and shown on the pages of the document, may, depending on how the user assigns the page number, not be consistent with the sequence of pages defined by the application.

For example, consider the situation in which the document includes a title page followed by a blank page, with the blank page to be the back side of the title page when duplex printing is performed. The pages after both the title page and the blank page are numbered beginning with page 1. However, following the sequence of pages defined by the application program, page 1 is defined to be the title page, page 2 is defined to be the blank page and is assigned to be the back side of the title page, and page 3 is assigned to the page with the user assigned page number of 1. If the user were to select the watermark feature and then apply the watermark feature to even pages (i.e. even pages in the sequence of pages defined by the application program), the blank page on the back side of the title page would receive the watermark, as would document page numbers 2, 4, 6, 8, etc. However, if the page after the title page was not blank (for example, if the printing were done single sided), then selecting even pages would cause the watermark to be applied to user assigned page numbers 1, 3, 5, 7, etc.

It is sometimes the case, depending upon the features selected for printing, that multiple pages of the document may be printed on a single unit of media (such as when N-up printing is performed). For some features, program module 202 must take into account the number of pages printed on a single unit of print media. For example, if a user selected the stapling feature for four pages of the document and the user also selected the N-up feature for printing, with 4 pages on each unit of media, stapling would be performed on a single unit of media. Therefore, program module 202 includes the capability to recognize these types of exceptional cases and disallow selection of features that would cause nonsensical outcomes. Furthermore, program module 202 would not support a per page application of some of the features. If the feature selected in box 302 is not one which is applicable to individual user selected pages, then program module 202 will not display band 306 with a pull down menu that would allow application of the selected feature to a single page. For example, the stapling feature would not be applied to printing on less than two units of print media. Therefore, attempting to associate the stapling feature with a single page is not permitted by program module 202.

Figure 4:
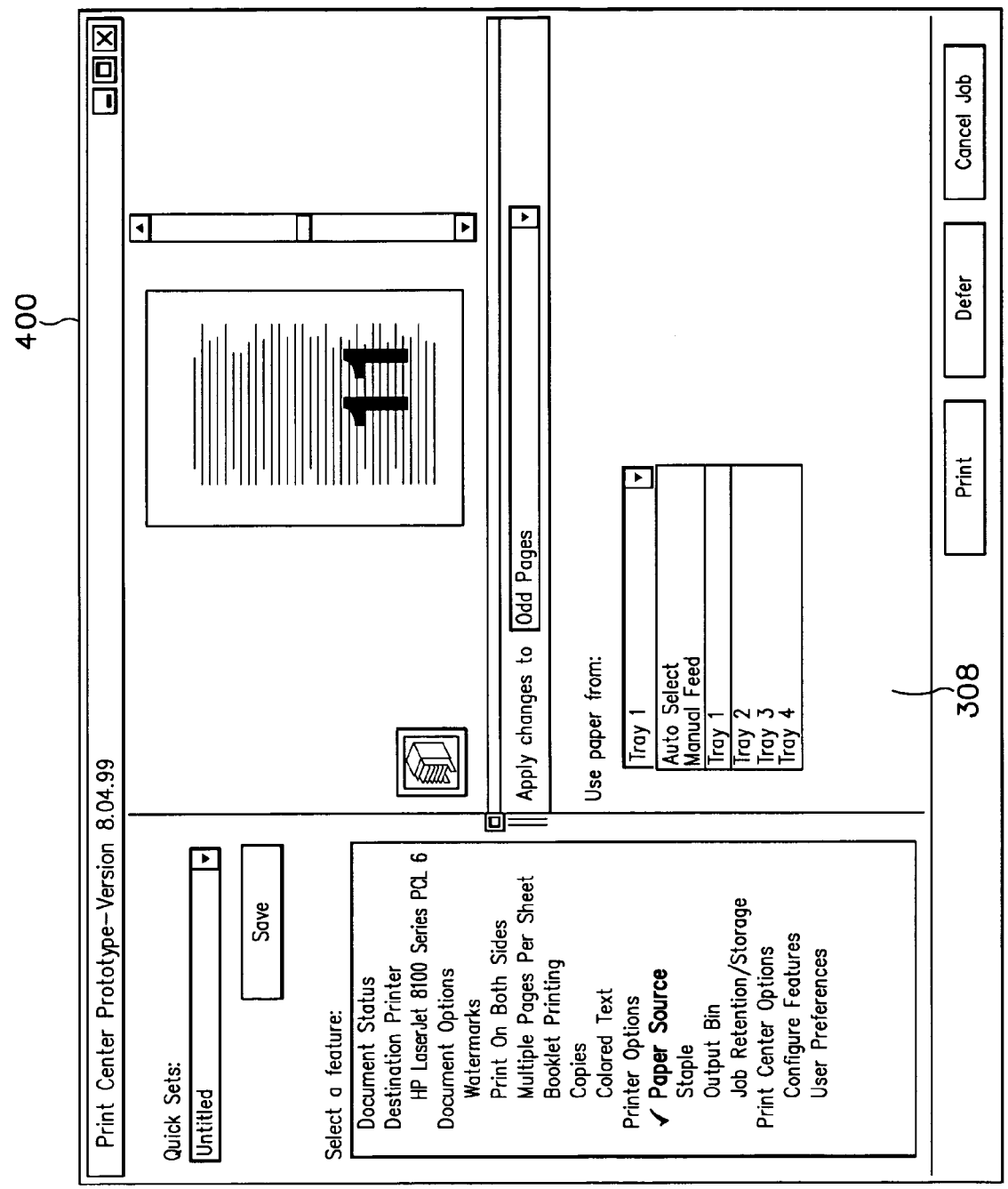

Shown in FIG. 4 is another representative window 400 that can be generated by program module 202. FIG. 4 displays the capability of program module 202 to allow the user to select the media source for any page, pages, user defined page range, or preset page classes in the document. The pull down menu shown in box 308 displays the media sources, such as trays for holding media, available for selection. The capability of program module 202 to arbitrarily assign, to one or more of the pages in the document, the media source would be useful to a user when printing a document having pages intended for different media types. For example, if the document includes pages intended for printing on overhead slides mixed with pages intended for printing on paper, the user could assign, on a per page basis, the overhead slide pages to use media from the media source containing overhead slides, and similarly the paper pages to use media from the media source containing paper of the desired size. This capability would be similarly useful for printing pages of a document on variety of sizes of print media.

In addition to the previously described capabilities, program module 202 includes the capability to send any of the pages of the document to a user selected imaging device. The computer executing the application may be connected through a network to more than one imaging device. These imaging devices could include a monochrome electrophotographic printer and an inkjet printer. Consider the example in which the document created by the user includes some pages having colored text or images and some pages which include only monochrome text and images. Typically, inkjet printers generate monochrome output at a lower rate than electrophotographic printers. By sending only the pages including color to the inkjet printer, a reduction in the time required to execute the print job could be achieved while requiring the user to initiate only a single print job.

Figure 5:
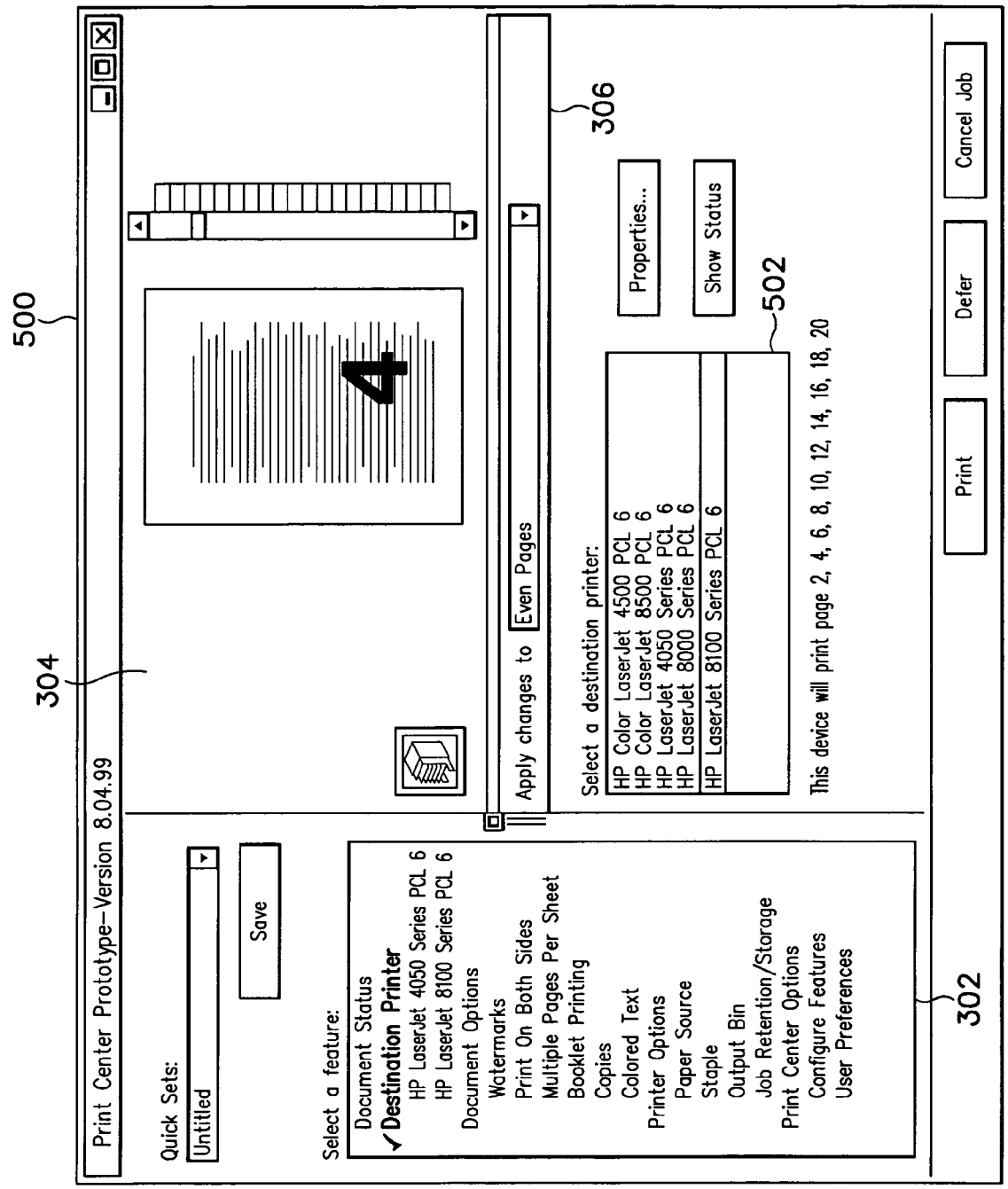

Shown in FIG. 5 is a representative window 500 generated by program module 202 showing, in box 302, selection of the feature related to the destination printer (as indicated by the highlighting of and check mark adjacent to "Destination Printer"). When the user selects the destination printer feature, program module 202 displays the available imaging devices for selection in box 502. The destination printer is selected by the user clicking on one of the printer selections displayed in box 502. In band 306, program module 202 permits the page, pages, page ranges, or preset page class that will be sent to the selected destination printer. Below box 502, program module 202 displays the page numbers of the document, as defined by the application program, that will be sent to the printer selected in box 502 for printing. As the user scrolls through the preview pages in box 304, the destination printer associated with the page displayed in box 502 is highlighted so that the user may easily see the destination printer to which the displayed page will be sent. The pull down menu accessed through band 306 includes a number of preset page classes for selection to send to the destination target printer. To select a single printer for receiving all of the pages of document the user would select the "All Pages" option from the pull down menu.

Other selections on the pull down menu in band 306 include sending the first page, the last page, even pages, odd pages to a selected destination printer for printing. Furthermore, a user can enter an arbitrary page range in band 306. Additional preset page classes are possible. For example, program module 202 could include capability for sending pages including color to a selected destination printer without requiring the user to specifically list the pages that included color. For this capability, program module 202 would receive information from the application program specifying which pages include color. With this information from the application program, program module would cause those pages of the print job including color to be sent to the selected destination printer. Another preset page class includes monochrome only pages. This preset page class would allow the user to direct monochrome only pages to a selected destination printer. It should be recognized that other print data specific page classes could be allowed. For example, if the pages included pictures, it may be desirable to print those pages including pictures on printers having higher resolution. Accordingly, the pull down menu in band 306 could include a preset page class permitting a user to send pages including pictures to a high resolution printer (or a printer configured for color printing) and pages including only text to a lower resolution printer. To support this capability in program module 202, the application program would provide information to program module 202 identifying text only pages and pages containing pictures. Program module 202 would use this information to send the pages including pictures to the assigned destination printer for picture printing.

The capability to direct arbitrary pages of the document to specific imaging devices becomes more complicated when this is attempted with N-up printing. Consider the case in which a document includes some pages having color and some monochrome only pages. Also, assume that the user has decided to print four document pages on each unit of media. Furthermore, assume that for one of the units of media on which printing will be performed, of the four document pages to be grouped together (because of their relative order in the sequence of pages in the document), three document pages are monochrome only and one document page includes color. In this case, even though there are three monochrome only pages, these will have to be printed on the imaging device having color capability because they will reside on the same unit of print media as the one document page including color. Therefore, for N-up printing, printer assignment on a per document page basis of the feature could generate unworkable outcomes in some cases. In some of these types of cases, certain features should be applied on a per unit of media basis.

Program module 202 includes a configuration to make the necessary adjustments to the preset page classes available in the pull down menu on band 306 when the features assigned include N-up printing and multiple destination printers in a single print job. One way to implement N-up printing with multiple destination printers in a single print job is to specify the preset page classes available in the pull down menu associated with band 306 in terms of units of print media which include multiple document pages. For example, where the assigned feature including stapling, two destination printers, and N-up printing with 4 document pages per unit of media, the preset page classes available would be limited so that the stapling feature would be performed on at least two pages of any destination printer selected.

With multiple destination printers and N-up printing, preset page classes defined in terms of one or more characteristics of document pages could also be accommodated. With selection of destination printers based upon preset page classes determined by characteristics of the document pages and selection of N-up printing, program module 202 partitions the document pages into groups based upon the number document pages to be printed upon each unit of media. Program module 202 then determines the destination of each of the groups based upon whether any document page within the group included the characteristic or characteristics of the preset class. Program module 202 then causes each of the groups (of up to N document pages) to be sent to the proper destination printer based upon one or more of the document pages in the group having the characteristic or characteristics of the preset class. The remainder of the groups of up to N document pages would be sent to another destination printer based upon none of the document pages in any of the groups having the characteristic or characteristics of the preset class.

An additional capability could be included in program module 202 to improve printing convenience for the user. If a user selected multiple destination printers for executing a single print job, manual collation of the printed output would still be required. As an alternative, program module 202 could include a configuration to print to a first destination printer with blank pages generated for those pages which are to be printed on a second of the destination printers. The user would then collect this output, including the blank pages substituted for those pages not printed on the first destination printer, and place it in the manual feed tray of the second destination printer selected. The second destination printer selected would print only on the pages designated for printing on that destination printer. The other pages would be treated by the second destination printer as blank pages. The output generated by the second destination printer (assuming only two destination printers were selected) would be the completed print job properly collated. It should be recognized that this process could be extended to an arbitrary number of destination printers.

Figure 6:
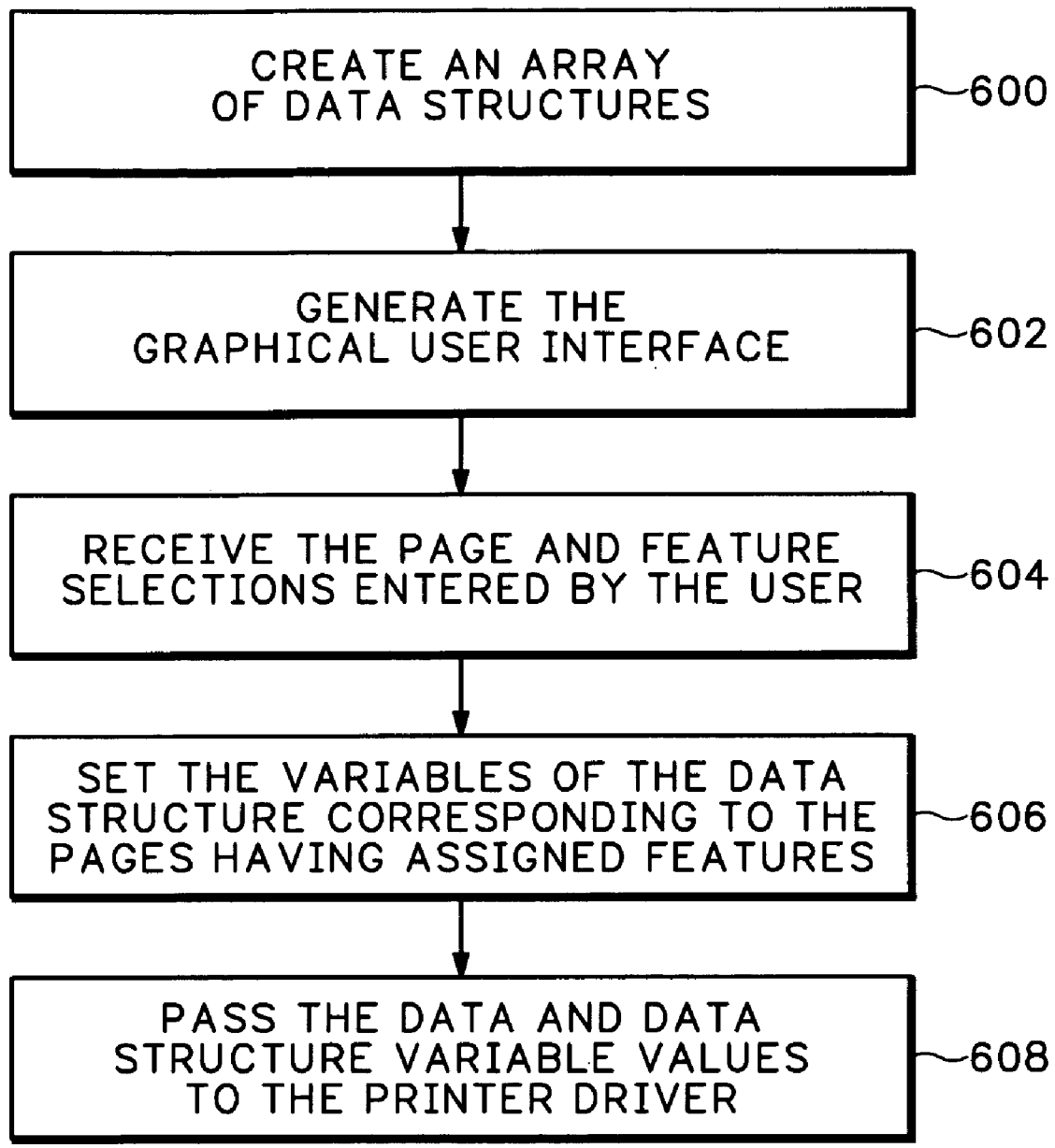
FIG. 6 shows a high level flow diagram of the operations performed by the program module.

Shown in FIG. 6 is a high level flow diagram of the operations performed by program module 202. In step 600, program module 202 creates an array of data structures, with each page of data generated by application program 200 having a corresponding data structure. The data structure for each page includes variables representing the possible features associated with each page, such as the watermark feature, the media source feature, destination printer, N-up printing mode, etc. Next, in step 602, program module 202 generates the graphical user interface window to allow the user to assign various features to various pages. Then, in step 604, program module 202 receives the page and feature selections entered by the user using the graphical user interface window. Next, in step 606, program module 202 sets the values of the variables in the array of data structures corresponding to the pages to which the user assigned features. Finally, in step 608, program module 202 sends the data for the pages to the destination imaging device through printer driver 204. In addition, program module 202 passes the values of the variables in the data structure to printer driver 204 so that the imaging operation can be performed on a per page basis according to the values of the variables in the corresponding data structure.

Although several embodiments of the invention have been illustrated, and their forms described, it is readily apparent to those of ordinary skill in the art that various modifications may be made to these embodiments without departing from the spirit of the invention or from the scope of the appended claims.

What is claimed is:

1. A method for forming images on media using a plurality of pages of data, comprising:
    selecting a first imaging related option to form images on the media using multiple of the plurality of pages of data on individual of the media;
    selecting a second imaging related option to form images on the media using a first imaging device having a capability to form the images on the media at a first resolution for ones of the plurality of pages of data including data corresponding to a picture and using a second imaging device having a capability to form images on the media at a second resolution less than the first resolution for ones of the plurality of pages of data including only data corresponding to text;
    partitioning the plurality of pages of data into a plurality of sets, individual of the plurality of sets including the multiple of the pages of data;
    forming images on the media using the first imaging device for ones of the plurality of sets having at least one of the included pages of data including the data corresponding to the picture; and
    forming images on the media using the second imaging device for ones of the plurality of sets for which the pages of data include only the data corresponding to the text.

2. A method for forming images on media using a plurality of pages of data having an order, comprising:
    identifying ones of the plurality of pages of data having a first characteristic and ones of the plurality of pages of data having a second characteristic;
    sending the plurality of pages of data to a first imaging device capable of forming the images on the media for the plurality of pages of data having the first characteristic;
    forming the images on the media, corresponding to the ones of the plurality of pages of data having the first characteristic, using the first imaging device;
    including blank units of the media, corresponding to the ones of the plurality of pages of data having the second characteristic, among units of the media having the images corresponding to the first characteristic according to the order;
    sending the plurality of pages of data to a second imaging device capable of forming the images on the media for the plurality of pages of data having the second characteristic; and
    forming the images on the blank units of the media, corresponding to the ones of the plurality of pages of data having the second characteristic, using the second imaging device.

3. The method as recited in claim 2, wherein:
    the first characteristic corresponds to color data included in the ones of the plurality of pages of data having the first characteristic;
    the first imaging device includes a capability of forming color images on the media;
    the second characteristic corresponds to only monochrome data included in the ones of the plurality of pages of data having the second characteristic; and
    the second imaging device includes a capability of forming only monochrome images on the media.

4. The method as recited in claim 2, wherein:
    the first characteristic corresponds to data at a first resolution included in the ones of the plurality of pages of data having the first characteristic;
    the first imaging device includes a capability of forming the images on the media at the first resolution;
    the second characteristic corresponds to only data less than or equal to a second resolution, less than the first resolution, included in the ones of the plurality of pages of data having the second characteristic; and
    the second imaging device includes a capability of forming the images on the media at the second resolution.

* * * * *